United States Patent
Brownell et al.

(10) Patent No.: US 7,419,082 B2
(45) Date of Patent: Sep. 2, 2008

(54) FRICTION WELDING PROCESS

(75) Inventors: John B Brownell, Derby (GB);
Jonathan P Throssell, Derby (GB);
Simon E Bray, Derby (GB)

(73) Assignee: Rolls-Royce plc, London (GB)

(*) Notice: Subject to any disclaimer, the term of this patent is extended or adjusted under 35 U.S.C. 154(b) by 568 days.

(21) Appl. No.: 11/025,120

(22) Filed: Dec. 30, 2004

(65) Prior Publication Data
US 2005/0156011 A1 Jul. 21, 2005

(30) Foreign Application Priority Data
Jan. 15, 2004 (GB) ................................. 0400821.5

(51) Int. Cl.
*B23K 20/12* (2006.01)
(52) U.S. Cl. ................. 228/2.1; 228/141.1; 156/73.5; 156/304.1; 156/304.2; 156/304.6
(58) Field of Classification Search ............ 228/2.1, 228/141.1; 156/73.5, 304.1, 304.2, 304.6; 148/516; 29/889.1
See application file for complete search history.

(56) References Cited
U.S. PATENT DOCUMENTS

| | | | |
|---|---|---|---|
| 3,762,030 A | 10/1973 | Rajala | |
| 4,601,927 A | 7/1986 | Durfee | |
| 5,366,344 A * | 11/1994 | Gillbanks et al. | 416/213 R |
| 6,237,834 B1 | 5/2001 | Mahoney | |
| 6,524,072 B1 * | 2/2003 | Brownell et al. | 416/213 R |
| 6,575,612 B2 * | 6/2003 | Kageyama et al. | 362/544 |
| 2003/0056871 A1 | 3/2003 | Nakajima | |
| 2005/0076594 A1 * | 4/2005 | Warner | 52/459 |
| 2007/0181539 A1 * | 8/2007 | Richter | 219/98 |

FOREIGN PATENT DOCUMENTS

| | | |
|---|---|---|
| DE | 10 203 090 | 7/2003 |
| FR | 2 760 985 | 9/1998 |
| GB | 1 395 349 | 5/1975 |
| GB | 1 475 678 | 6/1977 |
| JP | 11216776 | 8/1999 |
| JP | 2000025117 | 1/2000 |
| JP | 2000127245 | 5/2000 |
| JP | 2000301364 | 10/2000 |

* cited by examiner

*Primary Examiner*—Jerry Lorengo
*Assistant Examiner*—Erin P Barry
(74) *Attorney, Agent, or Firm*—W. Warren Taltavull; Manelli Denison & Selter PLLC

(57) ABSTRACT

A friction welding process providing a workpiece having a weld surface, and a second workpiece having a weld surface. The workpieces being welded together at respective weld surfaces. Oscillatory motion is affected to the workpieces such that one weld surface moves across the other, thereby raising the temperature at the weld surfaces to create a weld interface. The oscillatory motion is ceased and the weld surfaces cool to weld the workpieces together at the interface. The workpiece has an extending portion, and the weld surface is provided on the extending portion. The extending portion includes an apex region, which engages the second workpiece's weld surface. A side face extends from the apex region to provide a gap between the side face and the second workpiece's weld surface. The gap allows weld flash material to pass from the weld interface through said gap.

11 Claims, 4 Drawing Sheets

FRICTION WELDING PROCESS

FIELD OF THE INVENTION

This invention relates to friction welding processes.

BACKGROUND OF THE INVENTION

Linear friction welding is the process for welding together two bodies or workpieces by converting mechanical energy to heat energy by the friction between the engaging weld surfaces of the two workpieces. The process involves effecting relative linear motion between the two workpieces while the weld surfaces remain in engagement with each other.

Linear friction welding in a normal atmosphere results in the formation of atmospheric reaction products due to the high temperatures. Additionally, surface contamination of the weld interfaces can also give rise to weld anomalies. Due to the flow regimes of the flash material between the two workpieces during the reciprocating motion of linear friction welding, the weld contamination may not be expelled from the weld zone by the flash material flow. At high levels of weld contamination, there may be a reduction in weld strength and life and cause the welded product to fail the quality standards required by high integrity joints.

SUMMARY OF THE INVENTION

According to one aspect of this invention, there is provided a friction welding process comprising providing a first workpiece comprising a first weld zone having a first weld surface and a second workpiece comprising a second weld zone having a second weld surface, at which weld surfaces the workpieces can be welded together, arranging the workpieces in engagement with each other at said weld surfaces, effecting oscillatory motion of the workpieces relative to each other such that at least one weld surface moves across the other, thereby raising the temperature at said weld surfaces to create a weld interface, and ceasing said relative oscillatory motion and allowing the weld surfaces to cool to weld the first and second workpieces together at said interface, wherein the first weld zone has an outwardly extending portion and the first weld surface is provided on the outwardly extending portion, the outwardly extending portion includes an apex region to engage the second weld surface and has a side face extending from one side of the apex region to provide a gap between the side face and the second weld surface, the aforementioned gap being of sufficient size to allow weld flash material formed during said oscillatory motion to pass from the weld interface through said gap.

According to another aspect of this invention, there is provided a workpiece for use in a friction welding process, the workpiece comprising a weld zone having a weld surface for engagement with a corresponding weld surface on a body, and the weld zone further comprising an outwardly extending portion, wherein the weld surface is provided on the outwardly extending portion, the outwardly extending portion includes an apex region to engage the second weld surface on the body and has a side face extending from one side of the apex region to provide a gap between the side face and the second weld surface, the aforementioned gap being of sufficient size to allow weld flash material formed during the friction welding process to pass therethrough.

The first and second weld surfaces may be generally planar. Alternatively, the first and second weld surfaces may be curvilinear.

The weld surfaces may be elongate. The direction of said motion may be transverse to the first weld surface. Alternatively, the direction of said motion may be along the first weld surface.

Conveniently, the outwardly extending portion is a tapering portion. In one embodiment, the tapering portion may be partially or wholly consumed during the welding process.

Preferably, the relative oscillating motion is linear motion. The maximum amplitude of oscillation is preferably half the width of the first weld surface plus half the width of the second weld surfaces. For this purpose, the amplitude of oscillation is defined as being the maximum displacement from the centre of oscillation.

In one embodiment, the outwardly extending portion may have generally straight sides, and may be of a generally pyramidal configuration. Alternatively, the outwardly extending portion may be of a domed convex configuration.

In the preferred embodiment of the present invention the outwardly extending portion comprises a further side face extending from the opposite side of the apex region to the first mentioned side face. The side faces may be generally symmetrical to each other about a central axis or plane of outwardly extending portion.

The apex region may be generally curvilinear. In one embodiment, the apex region may initially have a width of no more than substantially 5 mm, preferably no more than substantially 1 mm. The further side face may taper relative to the apex region.

The, or each side face may taper from the apex region at an angle in the range of 6° to 12°, conveniently substantially 8°.

Preferably, the size of the gap is greater than the thickness of the weld flash material. Where the gap is formed by the, or each, taper sidewall, the angle of the, or each, side face to the second weld surface is preferably greater than the angle subtended to the weld interface by the thickness of the weld flash material.

In some embodiments, the weld flash material may form successive regions of greater or lesser thickness. Preferably, the angle of the, or each, side face to the second weld surface is greater than the angle subtended at the weld interface by the region of greater thickness of the weld flash material closest to the weld interface.

Preferably, the apex region has a dimension extending generally transverse to the direction of motion. Preferably, the side faces taper generally along the direction of motion.

In the preferred embodiment, the outwardly extending portion provides the advantage, that the flow regime of the weld flash during the welding process is different to the flow regime when the weld surfaces are generally parallel. In the preferred embodiment, a central weld zone is created between the two surfaces and the flow regime created with the outwardly extending portion aids the expulsion of weld anomalies from the central weld zone. Also, in the preferred embodiment, the outwardly extending portion acts to expel weld anomalies which are either present on the surfaces or which form in regions of the surface open to the atmosphere.

The preferred embodiment of this invention provides the advantage that an upstanding tapering region at the weld interface which expels defects from the interface by changing the flow regime from that which would be expected by the use of planar surfaces.

BRIEF DESCRIPTION OF THE DRAWINGS

Embodiments of the invention will now be described by way of example only, with reference to the accompanying drawings, in which.

DETAILED DESCRIPTION OF THE INVENTION

Figure 1A:
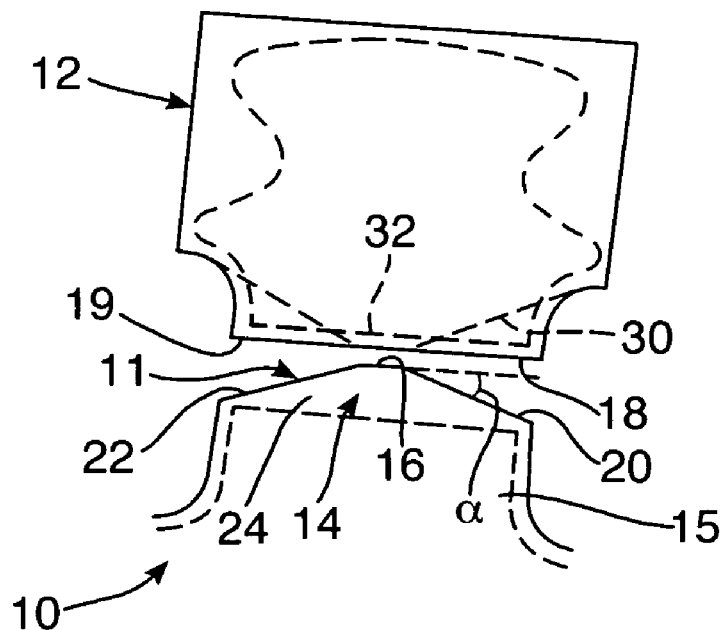
FIG. 1A is an end view of first and second workpieces undergoing a friction welding process.

Referring to FIG. 1A, there is shown first and second workpieces 10, 12 undergoing a linear friction welding process. The first and second workpieces 10, 12 can be any suitable bodies formed of a material, which is suitable for welding by a friction welding process such as linear friction welding. In particular, in the embodiment the first and second workpieces 10, 12 are respectively a disc and a rim post to be used in manufacturing a turbine disc. The first workpiece 10 comprises a weld zone 11 having an outwardly extending portion in the form of an upstanding tapering portion 14 having provided thereon a first weld surface 16. The first weld surface 16 is, in the embodiment shown, elongate and has a width of substantially 1 mm. The tapering portion 14 has a centreline 17 (see FIG. 1B).

Figure 1B:
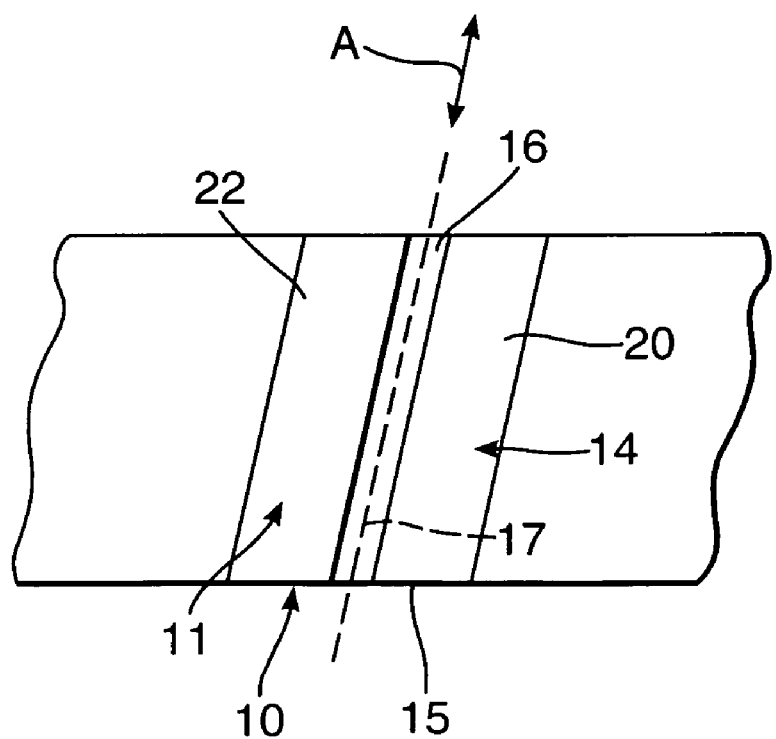
FIG. 1B is a plan view of the first workpiece shown in FIG. 1A.

The first workpiece 10 is shown in plan view in FIG. 1B and includes a projecting part 15 from which the tapering portion 14 extends. The weld surface 16 is an apex region of the tapering portion 14, and is generally planar in configuration. The weld surface 16 substantially follows the centreline 17.

The second workpiece 12 comprises a second weld surface 18, which comprises a second weld zone 19.

The first and second weld zones 11, 19 on the respective first and second workpieces 10, 12 are the zones of the two workpieces at which they are welded together, as described below.

The tapering portion 14 comprises first and second opposite tapering side faces 20, 22 which extend outwardly from the weld surface 16 which is also the apex of the tapering portion 14. In addition, the tapering portion 14 comprises first and second end faces 24, 26 that are generally perpendicular to the weld surface 16 from the opposite ends of the weld surface 16 of the tapering portion 14. The side faces 20, 22 extend from the weld surface 16 at an angle α in the region of between 6° and 12°.

In the embodiment shown in FIGS. 1A and 1B, the first and second workpieces 10, 12 are in the form of components prior to machining. In each case the broken lines 32 represent the configuration of the final project.

It will be appreciated, however, that if desired, the first and second workpieces 10, 12 could be in the form of the final products, which have already been machined.

Figure 2:
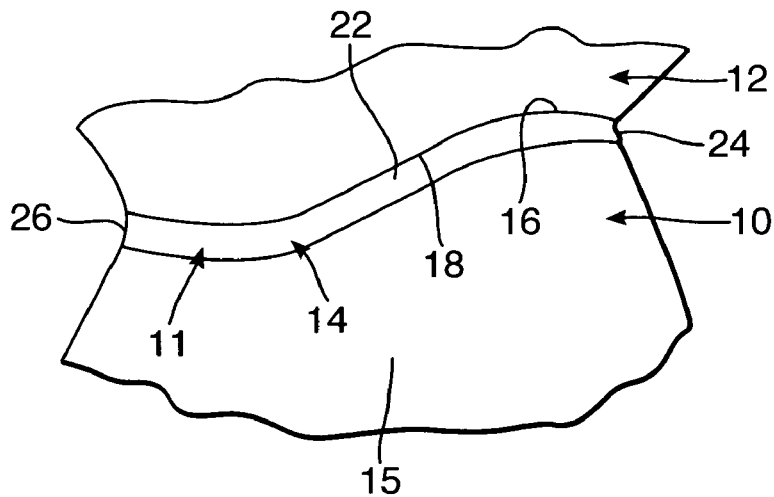
FIG. 2 is a side view of a curvilinear weld plane between first and second workpieces.
Figure 3:
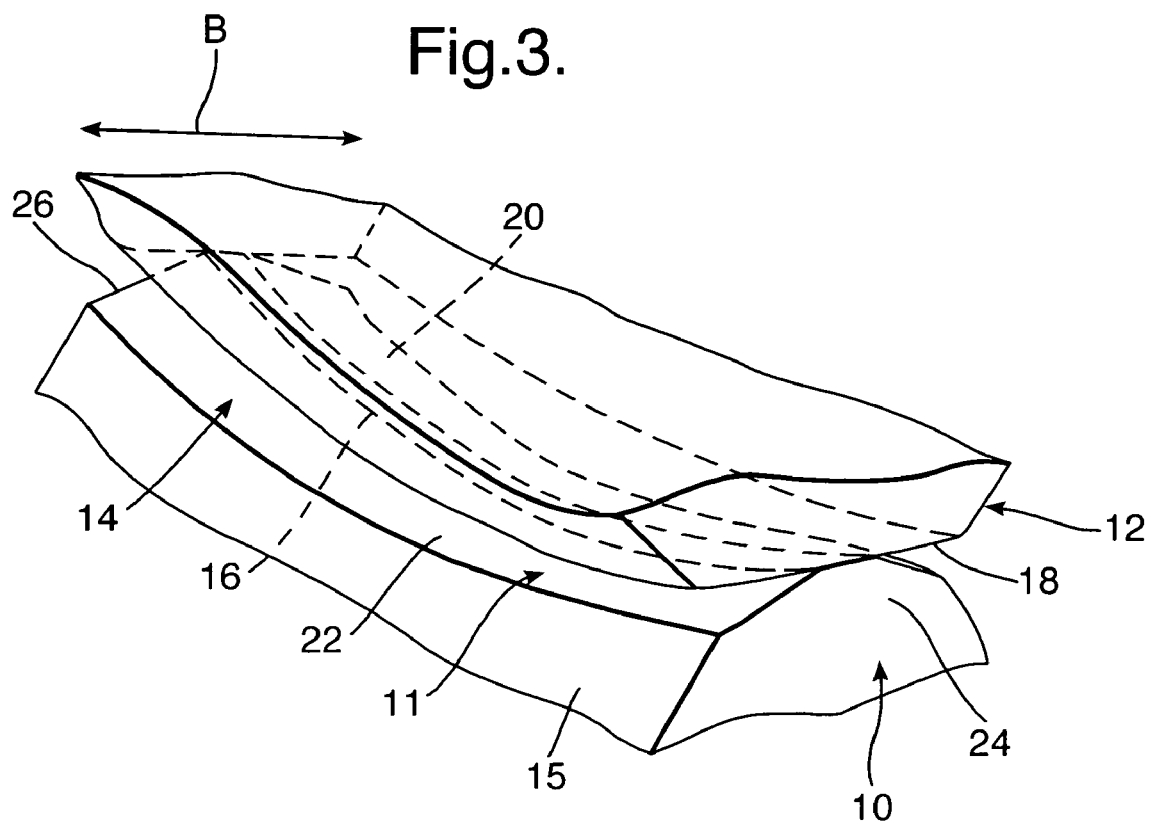
FIG. 3 is a perspective view of the first and second workpieces shown in FIG. 2.
Figure 4:
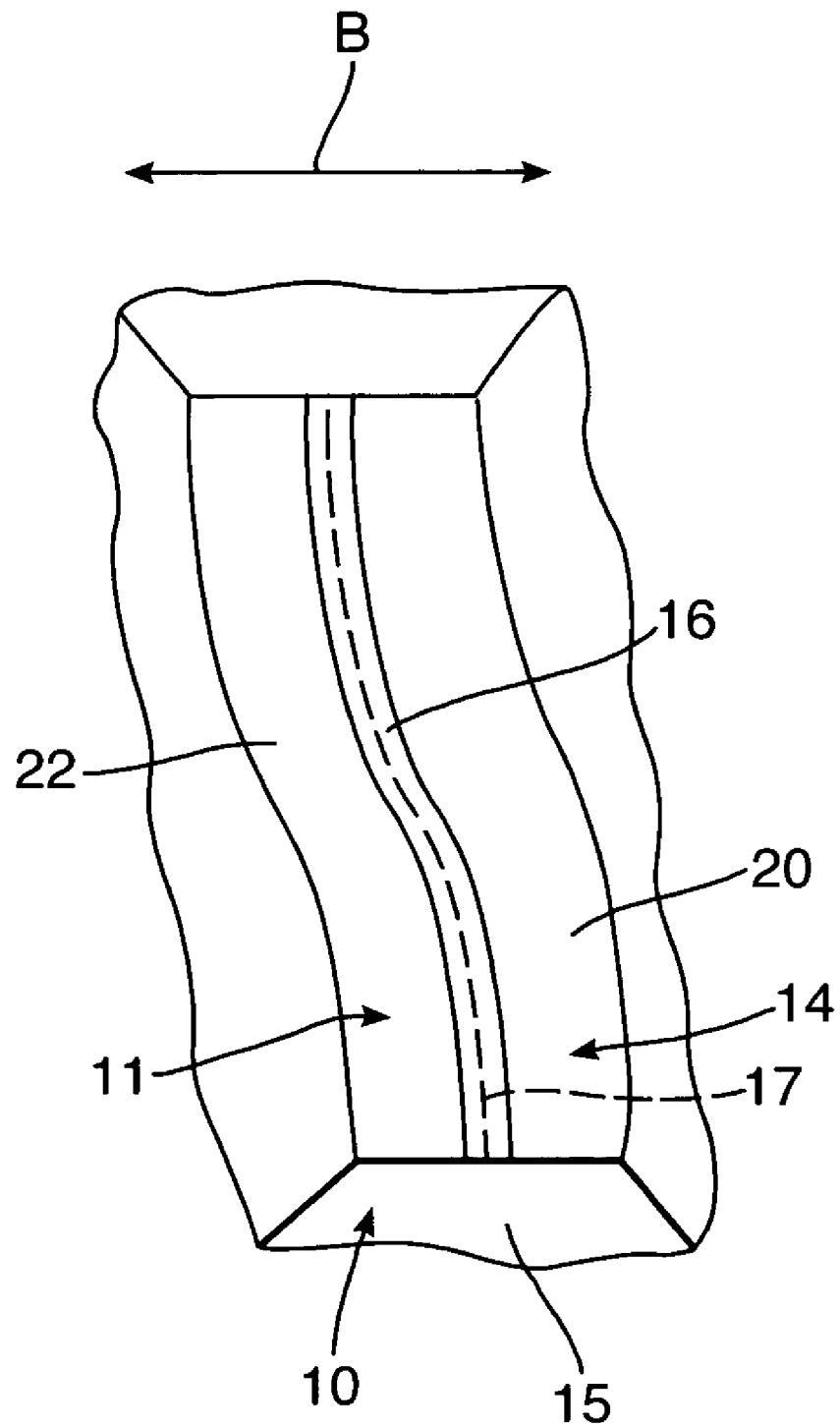
FIG. 4 is a plan view of a part of the first workpiece shown in FIG. 2.

FIGS. 2, 3 and 4 show a further embodiment, which comprises many of the features shown in FIGS. 1A and 1B. These features have been designated with the same reference numerals.

The embodiment shown in FIGS. 2, 3 and 4 differs from that shown in FIGS. 1A and 1B in that the embodiment shown in FIGS. 2, 3 and 4 has curvilinear weld surfaces 16, 18. As a result, the direction of relative movement of the workpieces is generally transverse to the centre line 17 of the weld surface 16 (see FIG. 4). The direction of said relative movement is shown by the double arrow B shown in FIGS. 3 and 4.

In operation, the first and second weld zones 11, 19 are brought into engagement with each other, and relative linear motion is effected between the first and second workpieces 10, 12, in the direction as shown by the double headed arrow A in FIGS. 1, 3 and 4.

By effecting this linear motion and normal force, in a manner which would be immediately apparent to the person skilled in the art, the frictional heat which is created at the interface between the first and second weld surfaces 16, 18, causes the temperature at the first and second weld surfaces 16, 18 to rise to values approaching, but below, the melting range of the respective materials on which the first and second workpieces 10, 12 are formed. The relative motion of the two workpieces 10, 12 wears away the tapering portion 14, thereby increasing the width of the first surface 16. When the tapering portion 14 has been fully, or partially, worn away, as determined by the person skilled in the art, the relative movement is then stopped and the pressure applied to the first and second workpieces 10, 12 causes the two bodies to be welded together as the interface between the first and second weld surfaces 16, 18 cools.

During the relative movement of the first and second bodies, a flow of weld flash is established in which, due to the taper of the side faces 20, 22, and of the end faces 24, 26 the weld flash is extruded from the weld interface between the first and second weld surfaces 16, 18. In addition, any defects, for example in the form of atmospheric reaction products formed due to the high temperatures are also expelled from the weld interface during the welding stage. A tapering gap is formed between the side faces 20, 22, and the second weld surface 18. The tapering gap so formed allows expulsion of weld defects as they are created in areas open to the atmosphere.

Figure 5:
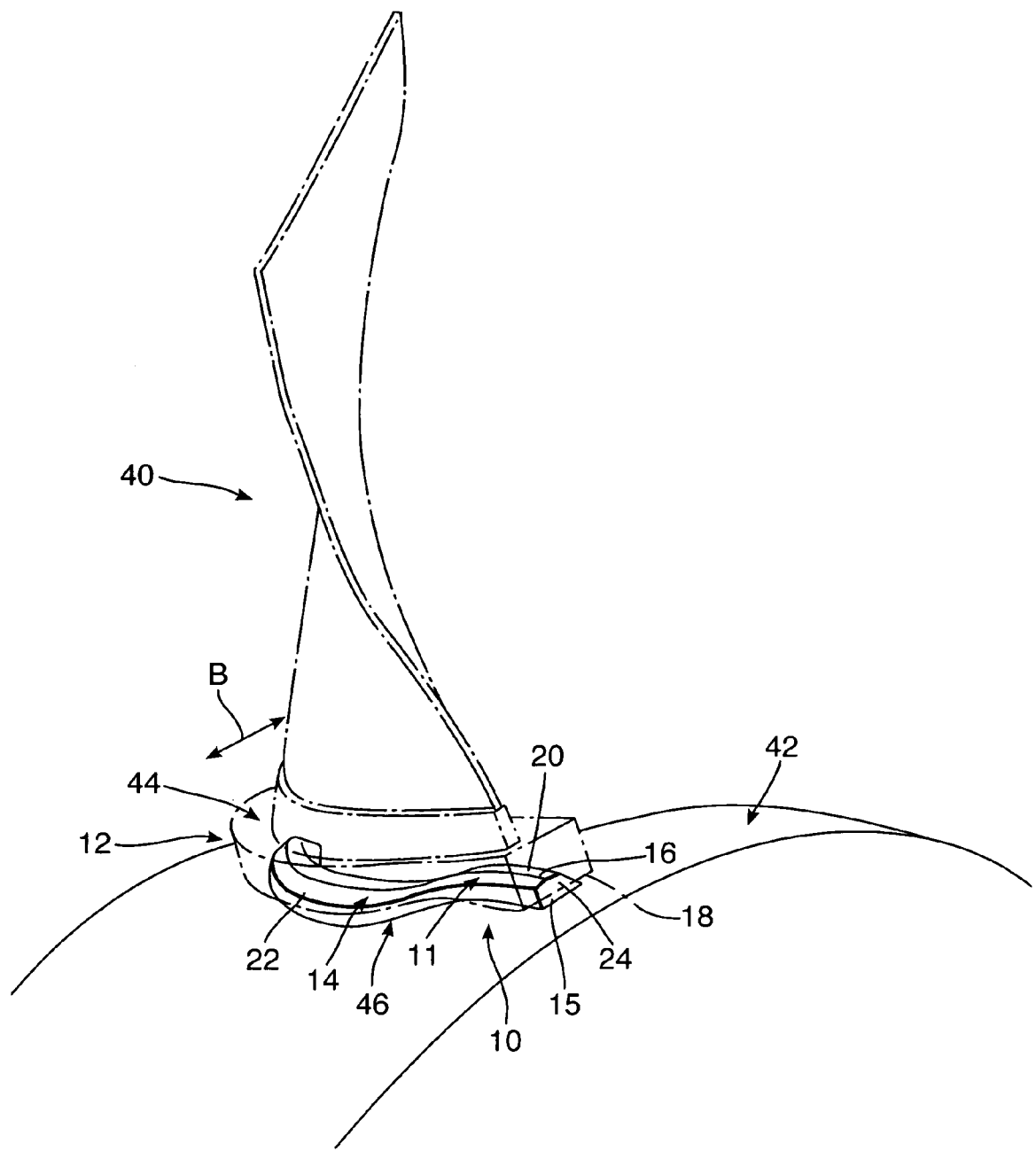
FIG. 5 is a perspective view of a blade being applied to a blisk.

FIG. 5 shows an embodiment in which a turbine blade 40 is welded directly to the upstanding tapering portion 14 on a disc 42. The turbine blade 40 has a base member 44 which constitutes the second workpiece 12. The disc 42 has a plurality of radially outwardly extending stubs 46 which constitute the first workpiece 10.

In order to weld the base member 44 of the blade 40 to the stub 46 on the disc 42, the respective weld surfaces 16, 18 are brought into engagement with each other and relative linear motion is effected to the two bodies in the directions of the double headed arrow B, in the same way as described above to weld the two components together.

Thus, the above-described embodiment provides the advantage of allowing the welding together of two workpieces at a weld interface, which is generally free from weld anomalies.

Various modifications can be made without departing from the scope of the invention. For example, the end faces 26, 24 could taper relative to the first weld surface 16. Also, the workpieces 10, 12 could be formed of other materials which could be welded by friction welding, for example, plastics materials. A further modification is that the second workpiece 12 could comprise an outwardly extending portion in the form of an upstanding tapering portion, as shown by the broken lines 30. The upstanding tapering portion 30 could have all the features of the aforementioned upstanding tapering portion 14 as described above. The upstanding tapering portion 30 defines a weld surface 32, as shown in FIG. 1. Another modification is that the side faces 20, 22 could be curved.

We claim:

1. A friction welding process comprising the steps of providing a first workpiece comprising a first weld zone having a first weld surface and a second workpiece comprising a second weld zone having a second weld surface, at which weld zones the workpieces can be welded together, arranging the workpieces in engagement with each other at said weld surfaces, effecting oscillatory motion of the workpieces relative to each other such that at least one weld surface moves across the other, thereby raising the temperature at said weld surfaces to create a weld interface, and ceasing said relative oscillatory motion and allowing the weld surfaces to cool to weld the first and second workpieces together at said interface, wherein the first weld zone has an outwardly extending portion and the first weld surface is provided on the outwardly extending portion, the outwardly extending portion has a generally triangular profile formed by two side faces which taper relative to an apex region which engages the second weld surface, the width of the apex region being less than the maximum amplitude of the oscillatory motion and the angle of the tapered surfaces being sufficient to provide a gap between the side face and the second weld surface, continuing oscilation of said workpieces in order to form the aforementioned gap with a sufficient size to allow weld flash material formed during said oscillatory motion to pass from the weld interface through said gap to expel weld anomalies and defects from the weld interface.

2. A friction welding process according to claim 1 in which the maximum amplitude of the oscillatory motion is half the width of the first surface plus half the width of the second surface, where the oscillation amplitude is the maximum displacement from the center of the oscillation.

3. A friction welding process according to claim 1 in which the outwardly extending portion has a curved configuration.

4. A friction welding process according to claim 1 wherein the side faces taper relative to the apex region at an angle of between substantially 6° and substantially 12°.

5. A friction welding process according to claim 1, wherein the side faces taper relative to the apex region at an angle of substantially 8°.

6. A friction welding process according to claim 1 wherein the apex region has a dimension extending generally transverse to the direction of oscillating motion, and the side faces taper generally along, or transverse to, the direction of oscillating motion.

7. A friction welding process according to claim 1, wherein the relative oscillating motion of the first and second workpieces is a linear motion.

8. A friction welding process comprising the steps of providing a first workpiece comprising a first weld zone having a first weld surface and a second workpiece comprising a second weld zone having a second weld surface, at which weld zones the workpieces can be welded together, arranging the workpieces in engagement with each other at said weld surfaces, effecting oscillatory motion of the workpieces relative to each other such that at least one weld surface moves across the other, thereby raising the temperature at said weld surfaces to create a weld interface, and ceasing said relative oscillatory motion and allowing the weld surfaces to cool to weld the first and second workpieces together at said interface, wherein the first weld zone has an outwardly extending portion and the first weld surface is provided on the outwardly extending portion, the outwardly extending portion includes an apex region to engage the second weld surface and has a side face extending from one side of the apex region to provide a gap between the side face and the second weld surface, the aforementioned gap being of sufficient size to allow weld flash material formed during said oscillatory motion to pass from the weld interface through said gap wherein the maximum amplitude of oscillation is half the width of the first weld surface plus half the width of the second weld surface, where the oscillation amplitude is the maximum displacement from the centre of oscillation.

9. A friction welding process comprising the steps of providing a first workpiece comprising a first weld zone having a first weld surface and a second workpiece comprising a second weld zone having a second weld surface, at which weld zones the workpieces can be welded together, arranging the workpieces in engagement with each other at said weld surfaces, effecting oscillatory motion of the workpieces relative to each other such that at least one weld surface moves across the other, thereby raising the temperature at said weld surfaces to create a weld interface, and ceasing said relative oscillatory motion and allowing the weld surfaces to cool to weld the first and second workpieces together at said interface, wherein the first weld zone has an outwardly extending portion and the first weld surface is provided on the outwardly extending portion, the outwardly extending portion includes an apex region to engage the second weld surface and has a side face extending from one side of the apex region to provide a gap between the side face and the second weld surface, the aforementioned gap being of sufficient size to allow weld flash material formed during said oscillatory motion to pass from the weld interface through said gap wherein the first and second weld surfaces are curvilinear.

10. A friction welding process according to claim 1 in which the first weld surface is elongate, and the direction of said motion is transverse to the first weld surface.

11. A friction welding process according to claim 1 in which the second workpiece has an outwardly extending portion and the second weld surface is provided on the outwardly extending portion of the second workpiece.

* * * * *